UNITED STATES PATENT OFFICE.

WALTER O. SNELLING, OF ALLENTOWN, PENNSYLVANIA, ASSIGNOR TO TROJAN POWDER COMPANY, OF NEW YORK, N. Y., A CORPORATION OF NEW YORK.

EXPLOSIVE COMPOUND.

1,310,969. Specification of Letters Patent. Patented July 22, 1919.

No Drawing. Application filed August 14, 1917. Serial No. 186,209.

*To all whom it may concern:*

Be it known that I, WALTER O. SNELLING, a citizen of the United States, and a resident of Allentown, in the county of Lehigh and State of Pennsylvania, have invented a new and useful Improvement in Explosive Compounds, of which the following is a specification.

My invention relates to improvements in the manufacture of explosives, and has special reference to the preparation of an improved propulsive explosive from nitrostarch.

Efforts have previously been made to prepare smokeless powder from nitrostarch, but these efforts have not been commercially successful, and no smokeless powder having a nitrostarch base has up to the present time been found suitable for military use. It has been found that colloided nitrostarch shrinks badly on evaporation of the volatile colloiding agent, leading to difficulty in preparing grains or particles of suitable size or shape, and it has also been found that colloided nitrostarch is extremely brittle, and tends to crush and break up in the gun at the moment of firing, due to the pressure produced by the products of combustion, and thus produces very erratic ballistic results.

My basic discovery is that smokeless powder can be produced from nitrostarch, without colloiding the interior of the granules of the nitrostarch, and that accordingly a product can be obtained which possesses the mechanical strength due to the uncolloided nitrostarch granules themselves.

According to my invention I employ as the basis for my smokeless powder starch that has been nitrated in such a manner as to preserve the granules of the starch in their original shape, and I then treat the surface of the nitrostarch granules in such a manner as to bring about their adhesion, and to enable them to be pressed or compacted into grains or particles of any desired size or shape, to produce grains that have sufficient mechanical strength to withstand the very high pressures which exist even in guns of large caliber on firing.

As an example of my invention, I may take granules of nitrated starch of about 13% N, and superficially colloid the surface of these granules, followed by compression of the superficially colloided granules into molds of desired size and shape, where the colloided surfaces will come into sufficiently close contact to unite and bring about the adhesion of the granules into a firm grain of high mechanical strength. To bring about the superficial colloidization of the surface of the nitrostarch granules I prefer to use a substantially non-volatile colloidizing agent, assisted by heat, and I find that a convenient way of making smokeless powder according to my present invention consists in thoroughly incorporating in any suitable type of mixing machine 87 kg. of dry nitrostarch of about 13% N, and 13 kg. of commercial liquid trinitrotoluene, and continuing the mixing at a temperature of 30° to 35° C. until the liquid trinitrotoluene has been thoroughly and uniformly spread over the surface of the nitrostarch granules. This mixing will normally require from ten to twenty minutes, and gives a product in which each grain of nitrostarch is substantially unaltered in its interior, while the surface is colloided. By now pressing the mass in molds of any desired size or shape, the colloided surfaces will adhere strongly, so that grains of suitable form may be prepared.

After standing for a few hours the grains will be sufficiently hard to handle and use, or a special hardening treatment may be given, by exposing the grains to a temperature of 60° C., or higher, for a period of from thirty minutes to one hour.

In its broad aspect, my invention contemplates the preparation of a propulsive explosive from nitrostarch, by colloiding the exterior of nitrostarch granules, without materially colloiding the interior of such granules, and then bringing the colloided surfaces of a number of granules treated in the manner described together so as to secure the adhesion of the colloided surfaces, to prepare grains or particles of suitable size and shape. While I have described in the specific example given above, the application of my process to the preparation of one type of explosive from nitrostarch, it is to be understood that my process may also be practised with equal success in other ways, and therefore no limitations are to be imposed upon my invention except such as are indicated in the appended claims.

I claim as my invention:

1. Smokeless powder comprising granules of nitrostarch uncolloided in their interior and superficially colloided to secure adhesion.

2. Smokeless powder comprising compressed masses of nitro-starch granules superficially colloided but uncolloided in their interior.

3. The process of treating nitro-starch which consists in colloiding the nitro-starch granules on their surfaces only and then compressing said granules into pellets or the like.

4. The process of treating nitro-starch which consists in thoroughly mixing the same with liquid trinitrotoluene at such temperature and for such period of time as will cause superficial colloidization only of the nitro-starch granules and then compressing the mass into pellets or the like, substantially as described.

In testimony whereof I have hereunto subscribed my name this 13th day of August, 1917.

WALTER O. SNELLING.